May 10, 1960 C. E. SCHUTTE 2,936,195
VEHICLE TAILGATE CONSTRUCTION
Filed Nov. 8, 1957 3 Sheets-Sheet 1
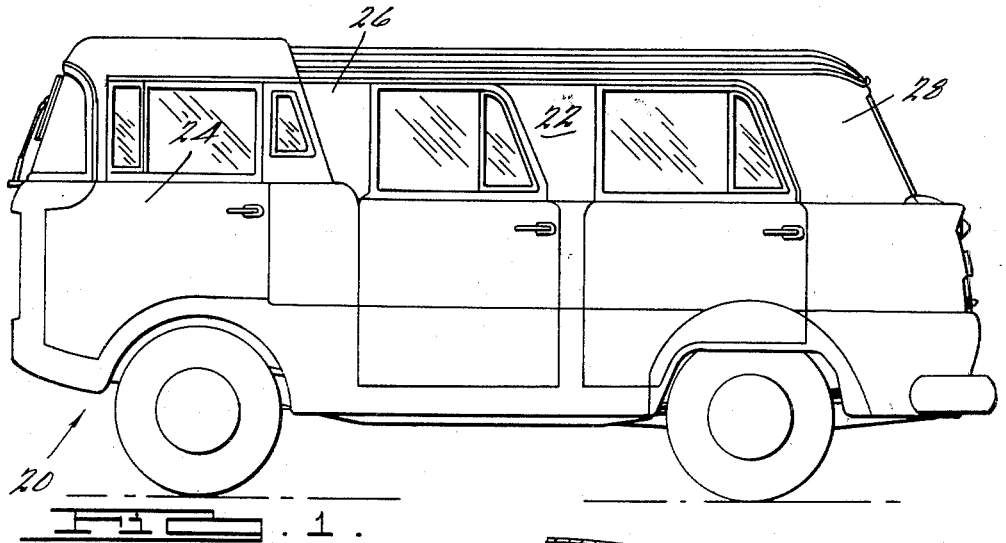
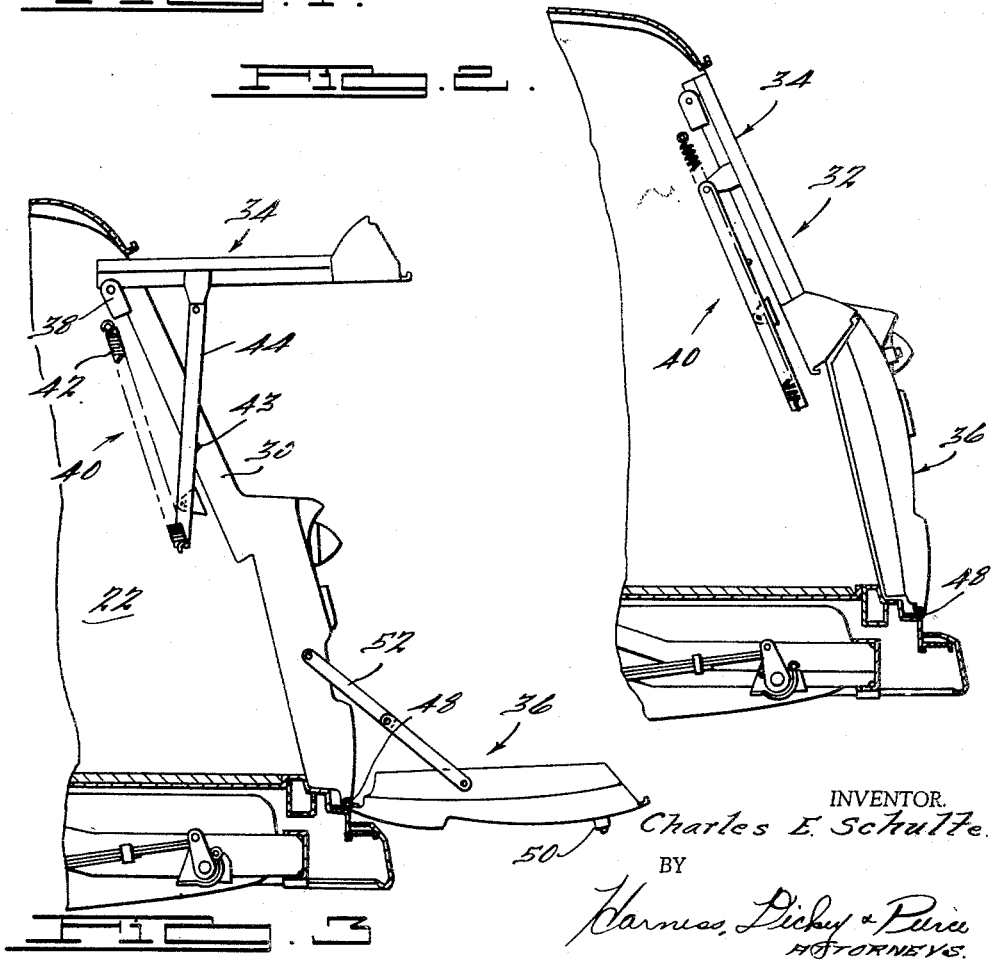
INVENTOR.
Charles E. Schutte.
BY
Harness, Dickey & Pierce
ATTORNEYS.

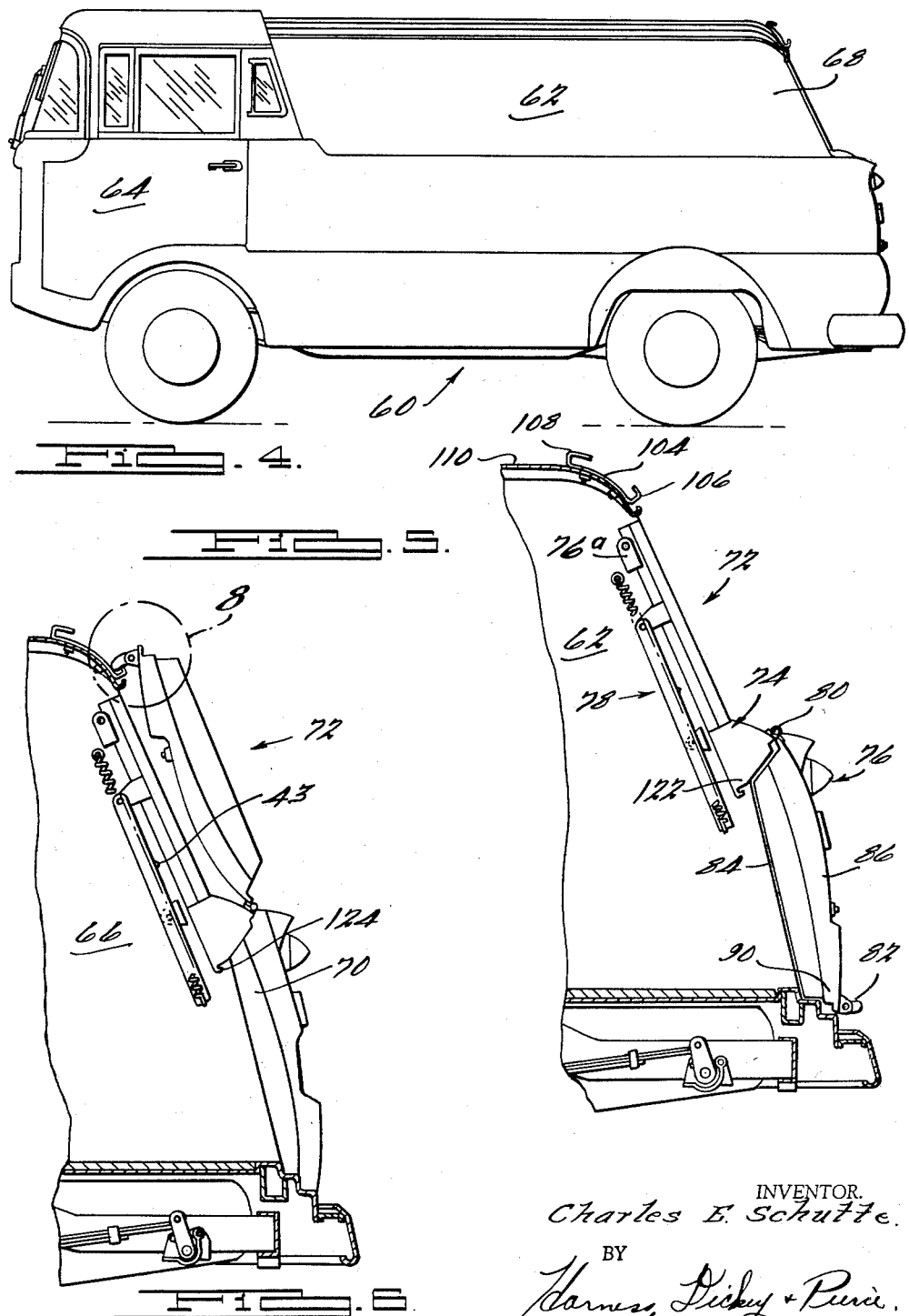

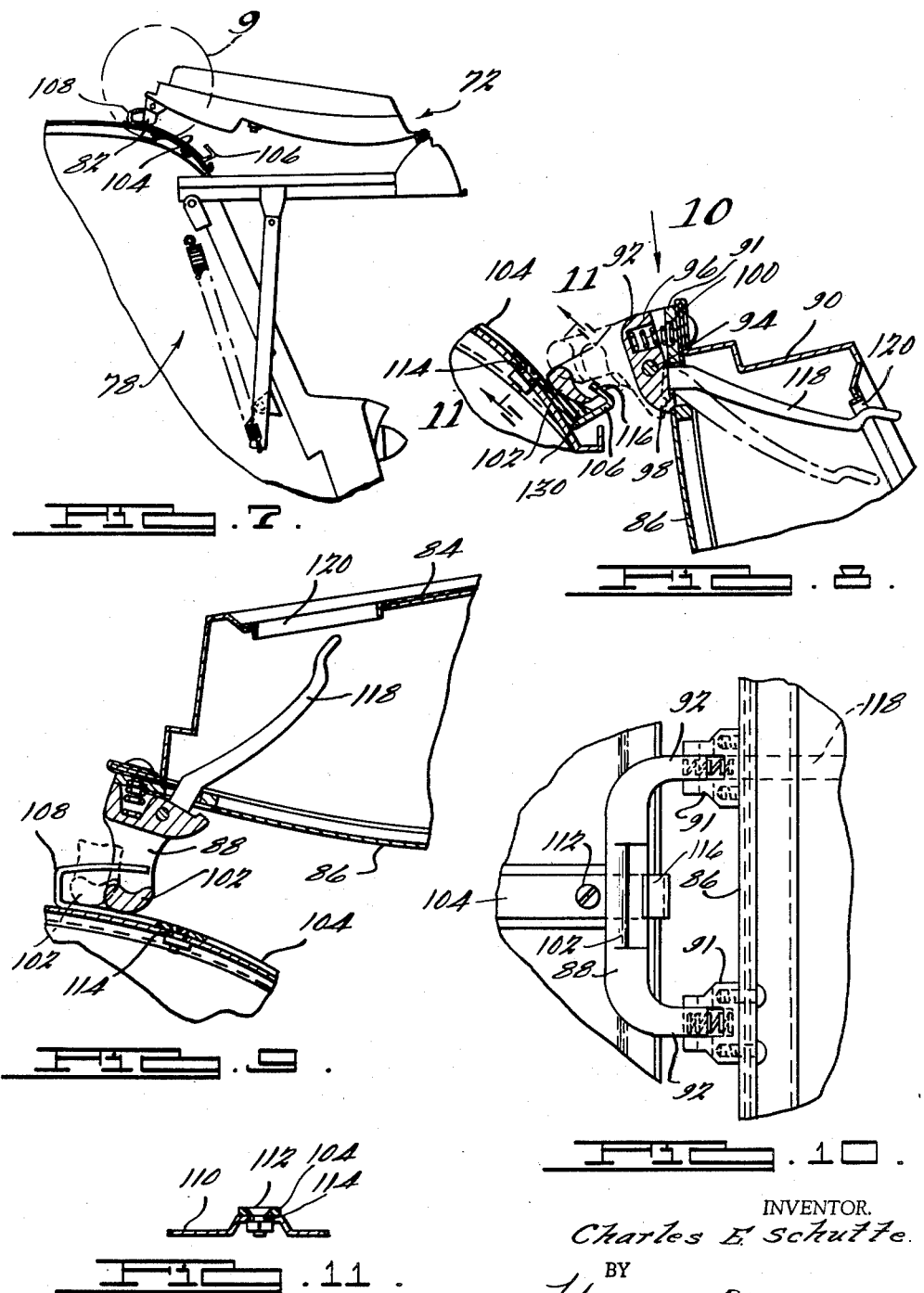

United States Patent Office 2,936,195
Patented May 10, 1960

2,936,195

VEHICLE TAILGATE CONSTRUCTION

Charles E. Schutte, Grosse Pointe Woods, Mich., assignor, by mesne assignments, to Bank of America National Trust and Savings Association, a national banking association Application November 8, 1957, Serial No. 695,300

6 Claims. (Cl. 296—106)

This invention relates generally to vehicle door structures and more particularly to a tailgate assembly which is adapted to be applied alternatively to station wagon and panel truck type vehicles.

The conventional station wagon tailgate assembly includes upper and lower door sections hinged at their upper and lower ends, respectively, to a vehicle rear end so that they are swingable about horizontal axes in opposite directions to open positions. The conventional panel truck tailgate assembly is normally considerably different, consisting of a pair of upright doors hinged to opposite sides of the truck and swingable in opposite directions about vertical axes to open positions. In those cases in which a manufacturer of both vehicle types, which is a usual situation, uses substantially identical bodies, the tooling costs incident to the manufacture of the tailgate assemblies are substantially double what they would be if a single tailgate assembly was provided for both vehicle types.

The principal object of this invention, therefore, is to provide a tailgate assembly for a panel truck type vehicle, which utilizes the same door sections used in a station wagon tailgate assembly.

Another object of this invention is to provide an improved vehicle tailgate assembly which provides convenient access to the interior of the vehicle at the rear end and which is movable to a completely out of the way position so that the vehicle can be backed up to a dock or the like.

A further object of this invention is to provide a vehicle tailgate assembly which is simple in construction, economical to manufacture, and efficient in operation in opening or closing a vehicle compartment.

Further objects, features and advantages of this invention will become apparent from a consideration of the following description, and the appended claims, when taken in connection with the accompanying drawing in which:

Figure 1 is a side elevational view of a station wagon type vehicle provided with the tailgate assembly of this invention;

Fig. 2 is a fragmentary longitudinal sectional view of a rear end portion of the station wagon illustrated in Fig. 1, showing the tailgate assembly in a closed position;

Fig. 3 is a fragmentary longitudinal sectional view illustrated similarly to Fig. 2 and showing the tailgate assembly in an open position.

Fig. 4 is a side elevational view of a panel truck type vehicle provided with the tailgate assembly of this invention;

Figs. 5, 6 and 7 are fragmentary longitudinal sectional views of the rear end portion of the panel truck illustrated in Fig. 4, showing the tailgate assembly in closed, partially open, and fully open positions, respectively.

Figs. 8 and 9 are fragmentary enlarged views of the portions of the tailgate assembly enclosed within the circles, indicated at 8 and 9 in Figs. 6 and 7, respectively;

Fig. 10 is a fragmentary top view looking in the direction of the arrow "10" in Fig. 8; and Fig. 11 is a transverse sectional view looking along the line 11—11 in Fig. 8.

With reference to the drawing, a station wagon type vehicle indicated generally at 20, is illustrated in Fig. 1 as including a body 22 having the usual cab or driver enclosing portion 24 at the front end and a passenger carrying portion 26 disposed rearwardly of the cab portion 24. The vehicle 20 has a rear end 28 provided with the usual access opening 30 (Fig. 3) and a tailgate assembly 32. As shown in Figs. 2 and 3, the assembly 32 consists of upper and lower door sections 34 and 36, respectively, mounted for swinging movement in opposite directions to open positions in which the interior of the vehicle is readily accessible through the rear end opening 30. Upper door section 34 is pivotally supported at its ends on pivot supports 38 carried by the vehicle body 22 so that the door section 34 is swingable up and down between the closed and open positions illustrated in Figs. 2 and 3, respectively.

A pair of check arm assemblies 40 (only one of which is shown) are carried by the vehicle body 22 for engagement with the ends of the upper door section 34 at locations spaced from the pivot supports 38 to support the door section in the open position illustrated in Fig. 3. Each check arm support 40 is of well known construction, including a spring 42, a slide arm 44 and a star wheel 43 (only a portion of which is shown) for releasably maintaining the door section 34 in a moved position. To move the upper door assembly 34 from an open to a closed position, the door is first moved upwardly so that the star wheels release the arms 44 so that the door can be swung downwardly to a closed position.

The lower door section 36 is pivotally supported at its lower end on a hinge 48 mounted on the vehicle body 22 at the lower end of the opening 30. A handle 50 facilitates movement of the lower door section between its closed and open positions shown in Figs. 2 and 3, respectively, and folding rod or strap assemblies 52 connected to and extending between the vehicle body 22 and the door section 36 support the door section in its open position.

In use, the tailgate assembly 32 is operated in the conventional manner. A latch mechanism (not shown) associated with each door section 34 and 36 maintains the door section in a closed position when desired.

In Fig. 4 a panel truck type vehicle 60 is illustrated having a body 62 which provides a driver enclosing portion 64 at the forward end of the vehicle and a compartment 66 rearwardly of the driver portion 64 for material, supplies or the like to be transported in the vehicle 60. The rear end 68 of the vehicle is provided with an access opening 70 for the compartment 66 and a tailgate assembly 72 for selectively closing the opening 70.

As shown in Figs. 5, 6, and 7, the assembly 72 consists of an upper door section 74 and a lower door section 76 substantially identical to the corresponding door sections 34 and 36 in the tailgate assembly 32 previously described. In the assembly 72, the upper door section 74 is carried on pivot supports 76a mounted on the vehicle body 62 which provide a mounting for the upper door section 74 exactly like the mounting of the door section 34 in the assembly 32. Check arm supports 78, like the supports 40 previously described, support the ends of the upper door section 72.

As best appears in Fig. 5, the lower door section 76 is supported on a hinge 80 carried by the lower end of the upper door section 74 so that the lower door section 76, which is of a hollow construction having an inner wall 84 and an outer wall 86, can be swung upwardly about the lower end of the upper door section 74 to the position illustrated in Fig. 6. A handle assembly 82 mounted on the lower door section 76 facilitates upward swinging thereof about the hinge 80 and consists of a U-shaped body member 88 mounted at its ends in brackets 91 which are secured to and constitute extensions of the outer wall 86 adjacent the end 90 of the door section 76, which end is hereinafter referred to as the lower end for convenience of description. The ends 92 of the body member 88 are enlarged and are mounted for up and down swinging movement about transverse pivots 94 carried by the brackets 91. Each end 92 is swingable in opposite directions between the stop positions illustrated in solid and broken lines in Fig. 8 in which terminal portions 96 and 98 on opposite sides of the pivot 94 engage the brackets 91. A spring 100 at each end 92 extends between the corresponding bracket 91 and the body member 88 for normally maintaining the body member 88 in the position illustrated in solid lines in Fig. 8 in which the terminal portion 98 engages the bracket 91. In this position of the body member 88, a central cam-shape striker portion 102 of the body member 88 is in what is referred to as a locking position for a purpose to appear later.

An irregularly shaped bracket member 104 (Fig. 5) having facing hook-shape ends 106 and 108 is secured to the top wall 110 of the vehicle body 62. A pair of bolts 112 extend through slots 114 in the vehicle top wall 110 for adjustably attaching the bracket 104 to the vehicle body 62.

The bracket 104 is located on the top wall 110 such that the in-turned terminal end portion 116 of the hook shape end 106 engages the handle striker portion 102 during upward swinging movement of the lower door section 76 to the position illustrated in Fig. 6. The terminal bracket portion 116 moves the striker portion 102 upwardly against the action of the springs 100 so that the striker portion 102 rides over the terminal bracket portion 116 as shown in Fig. 8. The springs 100 then operate to move the striker portion 102 to the locking position illustrated in solid lines in Fig. 8 confined within the hook-shape bracket end 106. In this position of the striker portion 102, the lower door section 76 is positively locked in the open position illustrated in Fig. 6 corresponding to a partially open position of the tailgate assembly 72.

When the vehicle is driven with the assembly 72 in this partly open position, the weight of the assembly and the force of the springs 42 on the slide arms 44 cooperates with the weight of the assembly to prevent accidental return to a closed position.

To release the striker portion 102 from the bracket end 106, in the event it is desired to move the lower door section 76 to a closed position, an elongated handle 118 secured to one end 92 of the body member 88 is swung downwardly, as viewed in Fig. 8, to in turn swing the striker portion 102 upwardly to a position out of the bracket end 106. An opening 120 in the inner wall 84 of the lower door section 76 provides access for manual operation of the handle 118.

In the event the tailgate assembly 72 is to be moved to a fully open position, from the partially open position illustrated in Fig. 6, the operator manually grasps the lower end 122 of the upper door section 74 and swings the upper door section upwardly. An angle member 124 at the lower end of the upper door section 74 provides a straight edge which facilitates manual lifting of the upper door section 74, which also causes further upward movement of the lower door section 76, with the handle assembly 82 sliding upwardly on the bracket 104.

On movement of the upper door section 74 to the fully open position shown in Fig. 7, and subsequent release of the door, the check arm supports 78 at the ends of the door operate to hold the door in its up position.

In the open position of the upper door section 74, the striker portion 102 on the handle unit 82 for the lower door section 76 is confined within the upper hooked end 108 of the bracket 104. However, in this confined position, the striker portion 102 is spaced from the upper end of the bracket 104, as shown in solid lines in Fig. 9, so that the striker portion 102 is movable upwardly to the dotted line position illustrated in Fig. 9 for release of the check arm supports 78 when closing of the tailgate assembly 72 is required.

In use, it is apparent that the tailgate assembly 72 is readily moved from the fully closed position illustrated in Fig. 5 to the partially open position illustrated in Fig. 6. In its partially open position, the tailgate assembly 72 closes only the upper portion of the rear access opening 66. The vehicle 60 may be driven with the tailgate assembly in this partially open position and to prevent excessive rattling of the striker portion 102 against the bracket 104, a rubber cushion 130 may be provided in the bracket end 106 for engaging the striker portion 102.

To move the tailgate assembly to the fully open position illustrated in Fig. 7, it is only necessary to manually grasp the door and swing it upwardly, with the striker portion 102 sliding on the bracket 104 during upward swinging movement of the upper door section 74 to the fully open position illustrated in Fig. 7. The check arm supports 78 provide sufficient support by itself to hold the tailgate assembly in the fully open position illustrated in Fig. 7, unless the vehicle 60 is to be driven with the tailgate assembly in this position, in which case a releasable locking device (not shown) on one of the check arm supports 78 prevents accidental closing of the assembly.

The assembly 72 is readily returned to a closed position (Fig. 5) by manually swinging the door sections in an opposite direction. A latch and lock assembly (not shown) carried by the lower door section 76 is operable to lock the door section 76 to the vehicle body 62 for maintaining the assembly 72 closed.

From the above description, it is seen that this invention provides tailgate assemblies 32 and 72 for the station wagon and panel truck type vehicles illustrated in Figs. 1 and 4, respectively, which use substantially identical upper and lower door sections. These door sections are pivotally mounted to adapt the assemblies 32 and 72 to the specific vehicle requirements. In the panel truck installation, the tailgate assembly 72 is mounted so that it does not interfere with movement of the truck to a position in which the rear end thereof is substantially against a loading dock or the like at the lower end of the door opening 70. Thus, the panel truck 60, which is used for transporting materials and the like can be readily loaded and unloaded.

In the case of the station wagon 20 wherein such loading is not involved in normal use of the vehicle, the tailgate assembly 32 is mounted so that the upper and lower door sections open in the usual manner and the upper door section can be opened for ventilation purposes without also opening the lower door section. Both assemblies 32 and 72 are accomplished with only a single tooling cost for forming the upper and lower door sections 34, 74 and 36, 76, respectively.

Although the invention has been described with respect to a preferred embodiment thereof, it is to be understood that it is not to be so limited, since changes can be made therein which are within the full intended scope of this invention as defined by the appended claims.

What is claimed is:

1. In combination with a vehicle having a body provided with an open rear end, a tailgate assembly comprising an upper door section hingedly connected adjacent the upper end thereof to said body for movement between a substantially upright position closing the upper portion of said rear end and an upwardly moved open position, a lower door section hingedly connected at one end to the lower end of said upper door section for movement between a first position extending downwardly from said upper door section for closing the lower portion of said rear end and a second upright position extending upwardly from the lower end of said upper door section at a location rearwardly thereof, and coacting latch means on the rear end of said body and the opposite end of said lower door section for releasably maintaining said lower door section in said second position, said latch means including bracket means on said body having hook shaped end portions the respective portions of which are engageable with the latch means on said lower door section when said upper door section is in its respective positions.

2. In combination with a vehicle having a body provided with a top and an open rear end, a tailgate assembly comprising an upper door section hingedly connected adjacent the upper end thereof to said body for movement between a substantially upright position closing the upper portion of said rear end and an upwardly moved open position, a lower door section hingedly connected at one end to the lower end of said upper door section for movement between a first position extending downwardly from said upper door section for closing the lower portion of said rear end and a second upright position extending from the lower end of said upper door section toward the upper end thereof at a location adjacent the rear side thereof, and hook and handle means on said body top and the opposite end of said lower door section, respectively, engageable in both positions of said upper door section for releasably maintaining said lower door section in said second position.

3. In combination with a vehicle having a top and an open rear end, a tailgate assembly comprising a pair of door sections arranged so as to have a pair of adjacent ends, a hinge member connected to said sections at said adjacent ends to provide for movement of said sections between relatively unfolded positions extending in opposite directions from said hinge member and relatively folded positions extending in generally the same direction from said hinge member, means pivotally supporting the end of one of said sections opposite said adjacent end on said vehicle rear end so that said sections are movable to positions depending from said pivotal supporting means for closing said open rear end, the other one of said sections having a handle at the end thereof opposite said adjacent end, said handle having a cam shape portion and being pivotally mounted for up and down movement, spring means associated with said handle for biasing said portion in one direction, said other door section being of a size such that in said relatively folded positions of said sections and with said one door section extending downwardly from said pivotal supporting means said handle is adjacent said top, bracket means on said top having a hook shape end engageable with said handle portion for maintaining said other section in said relatively folded position, said hook shape end having a portion engageable with said cam shape portion for moving said portion against said spring means on riding movement of said cam shape portion over said hook shape end to a spring urged position within said hook shape end, lever means secured to said handle for moving the cam shape portion in a direction against the pressure of said spring means for releasing said cam shape portion from said hook shape end, said one section being pivotally movable upwardly to an open position, said bracket means having a second hook shape end arranged in a facing relation with said first hook shape end engageable with said handle portion for maintaining said other section in said relatively folded position in the open position of said one section, and support means extending between said one section and said vehicle for releasably maintaining said one section in said open position.

4. In combination with a vehicle having an open rear end, a tailgate assembly comprising a pair of door sections arranged so as to have a pair of adjacent ends, a hinge member connected to said sections at said adjacent ends to provide for movement of said sections between relatively unfolded positions extending in opposite directions from said hinge member and relatively folded positions extending in generally the same direction from said hinge member, means pivotally supporting the end of one of said sections opposite said adjacent end on said vehicle rear end so that said sections are movable to positions depending from said pivotal supporting means for closing said open rear end, the other one of said sections having a handle at the end thereof opposite said adjacent end, said handle including a body pivotally mounted for back and forth movement on said lower door section and having a cam shape portion, spring means associated with said handle for biasing said body member in one direction, and hook means on said vehicle engageable with said handle portion for maintaining said other section in said relatively folded position, said cam shape portion riding over said hook means against the pressure of said spring means to a position within said hook means on movement of the other one of said sections upwardly to a relatively folded position in said depending position of said one section.

5. In combination with a vehicle having an opening at the rear end thereof, a tailgate assembly mounted on said vehicle at said rear end for closing said opening, said assembly including a door section mounted for up and down swinging movement about an axis extending transversely of said vehicle adjacent one end of said section, a handle assembly mounted on said door section at the end thereof opposite said one end, said handle assembly including a U-shape body member pivotally mounted on said door section for limited pivotal movement about an axis substantially parallel to said door axis and extending through the free ends of said body member, spring means associated with said body member on one side of said handle axis for biasing said body member in one direction, and hook means on said vehicle engageable with said body member for maintaining said door section in an upwardly moved position, said body member riding over said hook means against the pressure of said spring means to a position within said hook means.

6. In combination with a vehicle provided with a body having a top and a rear end, a tailgate assembly comprising a first door section having the upper end thereof pivotally supported on said rear end for up and down swinging movement, a second door section hinged at one end to said first door section for movement from a first depending closed position to a second upwardly extending open position, a bracket member on said body top extending longitudinally thereof, and a member on said second door section engageable with said bracket member for sliding movement thereon on upward swinging movement of said first door section with said second door section in said open position, and hook means on said bracket member engageable with said member on the second door section for releasably maintaining said second door section in an open position in a plurality of positions of said first door section.

References Cited in the file of this patent

UNITED STATES PATENTS

| | | |
|---|---|---|
| 1,753,907 | Scherer | Apr. 8, 1930 |
| 2,045,489 | Payette | June 23, 1936 |
| 2,057,555 | Clark et al. | Oct. 13, 1936 |
| 2,113,291 | Clark et al. | Apr. 5, 1938 |

FOREIGN PATENTS

| | | |
|---|---|---|
| 658,800 | Great Britain | Oct. 10, 1951 |